United States Patent [19]

Otsuka et al.

[11] Patent Number: 4,793,479
[45] Date of Patent: Dec. 27, 1988

[54] HOLDER TRAY OF A COMPACT DISC

[75] Inventors: Chusaburo Otsuka; Toshitsugu Yajima, both of Saitama, Japan

[73] Assignee: Shin-Estu Polymer Co., Ltd., Tokyo, Japan

[21] Appl. No.: 175,243

[22] Filed: Mar. 30, 1988

[30] Foreign Application Priority Data

Apr. 4, 1987 [JP] Japan .................................. 62-50315

[51] Int. Cl.4 ............................................. B65D 85/57
[52] U.S. Cl. ................................... 206/310; 206/309; 206/560
[58] Field of Search ............... 206/307, 309, 310, 444, 206/560; 360/133; 369/289, 291

[56] References Cited

U.S. PATENT DOCUMENTS

| 4,084,690 | 4/1978 | Pulse | 206/310 |
| 4,499,994 | 2/1985 | Rentch | 206/310 |
| 4,520,470 | 5/1985 | d'Alayer de Costemore d'arc | 206/310 |
| 4,702,369 | 10/1987 | Philosophe | 206/310 |
| 4,746,013 | 5/1988 | Suzuki et al. | 206/309 |

FOREIGN PATENT DOCUMENTS 3425579  1/1986  Fed. Rep. of Germany ...... 206/307

Primary Examiner—Jimmy G. Foster
Attorney, Agent, or Firm—Wenderoth, Lind & Ponack

[57] ABSTRACT

The holder tray for compact disc of the invention has a disc-engagement structure capable of holding a disc mounted thereon very reliably still with little resistance against demounting of the disc therefrom. The disc-engagement structure has a center pushing part raised above the center opening and connected with a plurality of radially arranged connecting pieces each in a cranked confuguration connecting the central pushing part and the periphery of the center opening, the riser parts collectively forming a cylindrical surface to contact with the inner periphery of the center hole of a compact disc mounted thereon. Further, a plurality of radially arranged flap pieces extend from the center pushing part each in a cantilever-like manner and each between two connecting pieces and, when the pushing part is pushed down, the free ends of the flap pieces are raised so as to push up the disc facilitating demounting thereof.

2 Claims, 6 Drawing Sheets

HOLDER TRAY OF A COMPACT DISC

BACKGROUND OF THE INVENTION

The present invention relates to a holder tray of a compact disc or, more particularly, to a holder tray of a jacket for keeping a compact disc made of a rigid plastic resin which simultaneously satisfies the usually incompatible requirements for the reliableness of holding of a disc thereon and easiness of demounting of the disc therefrom.

A "compact disc" is a recently developed recording medium from which the recorded information can be read out by means of a laser beam. By virtue of the extremely high density and fidelity of the recorded information therein, compact discs are highlighted as a promising recording medium not only as a replacement of traditional phonographic records, mainly, for recording and playing of music but also as a medium for recording of information requisite for controlling and operating various kinds of electronic instruments. Compact disc has a flat disc form having a diameter of, usually, about 120 mm with a center hole of about 15 mm diameter for facilitate exact mounting on a read-out instrument or a compact disc player. When a compact disc is not mounted on a read-out instrument or compact disc player, the compact disc is usually kept in a jacket made of a rigid plastic resin composed of a tray for mounting and holding the disc and a cover put thereon.

The disc tray of a jacket must satisfy several requirements not only in reliableness of holding of the disc during handling and transportation but also in easiness and convenience of mounting of the disc thereon and demounting of the disc therefrom. Since a compact disc is secured on the tray at the center hole by being engaged with the tray, the tray has a structure in the center portion to engage the compact disc thereon. In this regard, various different modifications have been proposed and are practically used for the disc-engagement structure at the center of the tray but none in the prior art is quite satisfactory in respect of the usually incompatible requirements for the reliableness of disc holding and easiness of mounting and demounting of a disc.

SUMMARY OF THE INVENTION

The present invention accordingly has an object to provide a holder tray for compact disc which has a structure of disc engagement at the center portion thereof to satisfy simultaneously the requirements for reliableness of disc holding and easiness in mounting and demounting of a compact disc.

The tray for a compact disc of the present invention is a generally flat, integrally shaped body made of a rigid plastic resin provided with (a) a circular center opening, (b) a pushing part raised above the surface of the body of the tray to form a space for pushing stroke below the lower surface thereof and coaxially positioned with the circular center opening, (c) a plurality of radially arranged connecting pieces each in a cranked form composed of a lower flat part connected to the periphery of the center opening, upper flat part connected to the periphery of the pushing part and a riser part connecting the lower and upper flat parts, the riser parts of the plurality of the radially arranged connecting pieces collectively forming an approximately cylindrical surface, and (d) a plurality of radially arranged flap pieces each cantilevered at the periphery of the pushing part and positioned between two connecting pieces.

The cantilevered flap pieces each may extend horizontally from the lower surface of the pushing part or may be in a cranked form, like the connecting piece, composed of a lower flap part forming a free end, upper flat part connected to the periphery of the pushing part and a riser part connecting the lower and upper flat parts, the riser parts of the plurality of the radially arranged flap pieces collectively forming substantially the same cylindrical surface as the cylindrical surface formed collectively by the riser parts of the radially arranged connecting pieces.

BRIEF DESCRIPTION OF THE DRAWING

FIG. 9a is a plan view of the inventive disc tray as an alternative embodiment in which each of the flap pieces has a cranked configuration and FIG. 9b is a cross sectional view of the same as viewed along the line IXb—IXb in FIG. 9a.

DETAILED DESCRIPTION OF THE PREFERRED EMBODIMENTS

In the first place, a typical compact disc tray of the prior art is illustrated with reference to FIGS. 1a and 1b and FIGS. 2a and 2b.

Figure 1A:
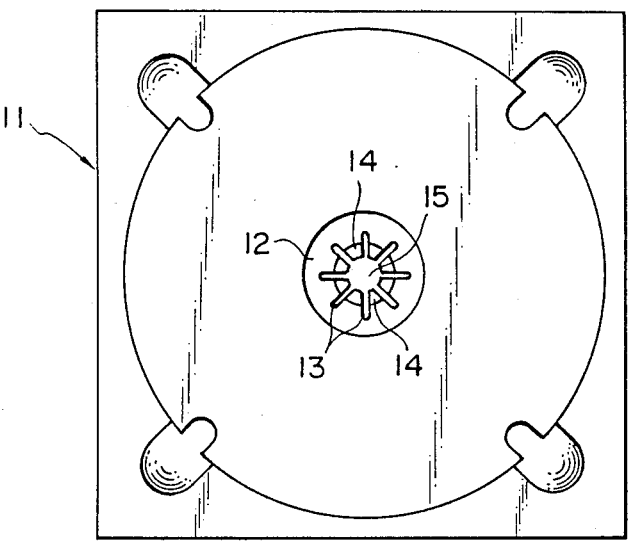
FIGS. 1a and 1b are a plan view and an axial cross sectional view, respectively, of a compact disc tray in the prior art
Figure 1B:
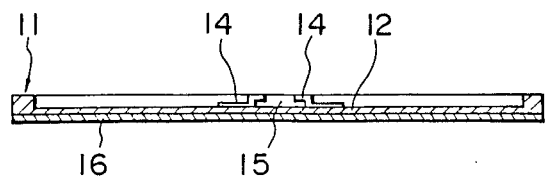

The disc tray 11 made of a rigid plastic resin is in a generally flat form provided with a disc-engagement structure in the center position having a small raised circular area 12 to serve as a disc mount with a circular center opening 15. The disc mount 12 is provided with a plurality of radially running incisions or notches 13. The part 14 between two incisions 13,13 is in a flap-like form cantilevered at the periphery of the circular center opening 15 extending toward the center. Each of the thus formed cantilevers 14 has a cranked cross sectional form as illustrated in FIG. 1b. The riser parts 14b of the cranked cantilevers 14 collectively form an approximately cylindrical surface while the upper flat parts of the cantilevers 14a collectively form a center flat to serve as a pushing part like a push button head above the center opening 15. Though not essential, the tray 11 is lined with a backing sheet member 16 to cover the center opening 15 from below.

Figure 2A:
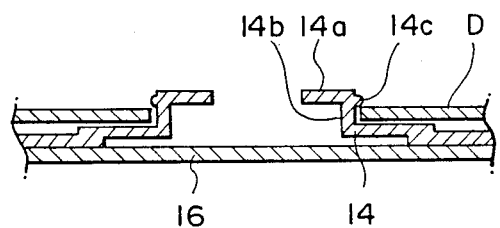
FIGS. 2a and 2b are each a partial cross sectional view of the compact disc tray in the prior art holding and under way of demounting of a compact disc.
Figure 2B:
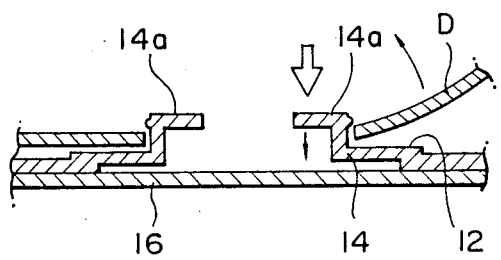

When a compact disc D is mounted on this disc tray 11 as is illustrated in FIG. 2a by inserting the central pushing part formed by the upper flats 14a of the cantilevers 14 into the center hole of the disc D, the disc D is secured and prevented from inadvertent falling by means of the small swellings or protrusions 14c each on the shoulder portion of one of the cranked cantilevers 14. When the disc D is to be demounted from the tray 11, as is illustrated in FIG. 2b, the disc D is lifted at the periphery thereof with one finger while the central pushing part 14a,14a is pressed down with another finger so as to facilitate lifting of the disc D by disengaging the disc D from the protrusions 14c,14c.

One of the problems in the above described disc tray of the prior art is that the compact disc D under demounting cannot be fully disengaged from the protrusions 14c,14c even by increasing the pushing force pressing down the central pushing part 14a,14a unless the force of the finger lifting the periphery of the disc D is also increased so that the disc D is unduly bent sometimes to be damaged or even destroyed. Moreover, the disc D is secured at the position by the cantilevers 14,14 each having a shoulder protrusion 14c alone which naturally are subject to deformation and change in the elasticity by the changes in the ambient temperature or by repeated mounting and demounting of discs to limit the durability of the disc tray 11. For example, the cantilevers 14,14 may lose elasticity and become brittle at low temperatures so as to be broken by pressing down at the center pushing part 14a,14a.

In contrast to the above described compact disc tray of the prior art, the disc tray of the invention has a disc-engagement structure capable of reliably securing a compact disc mounted thereon and still providing little resistance against demounting of a disc therefrom with no danger of damaging the disc as well as having high durability for use even by repeated mounting and demounting of discs. Although the disc tray of the invention is shaped preferably in an integral body by injection molding or other suitable molding means, it is optional that the body of the tray and the disc-engagement structure are shaped separately and thereafter bonded together by a suitable means such as adhesive bonding.

Figure 3:
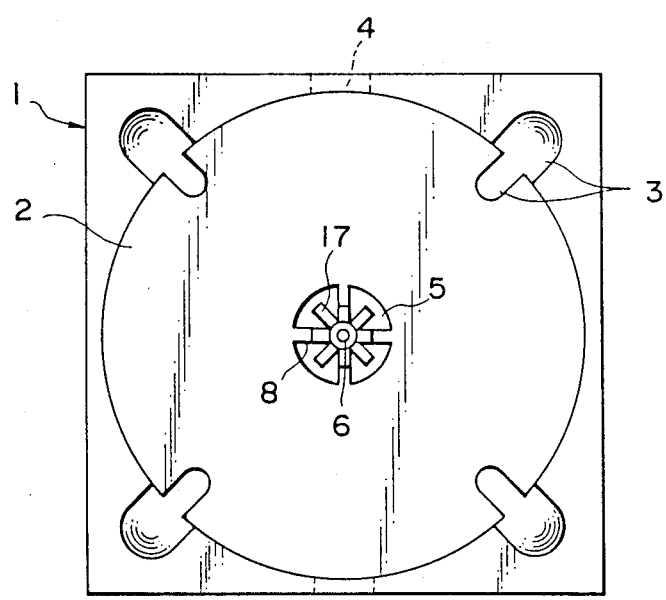
FIG. 3 is a plan view of the inventive compact disc tray and FIG. 4 is an enlarged plan view of the center part of the same compact disc tray.
Figure 4:
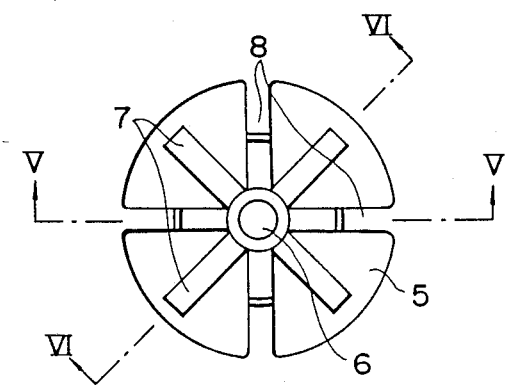
Figure 5A:
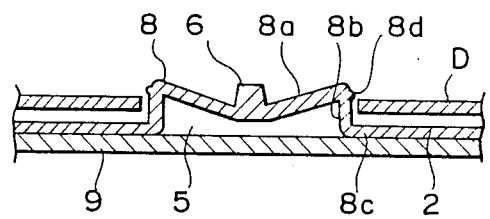
FIGS. 5a and 5b and FIGS. 6a and 6b are each an axial cross sectional view of the center part of the inventive compact disc tray holding and under way of demounting of a compact disc.
Figure 6A:
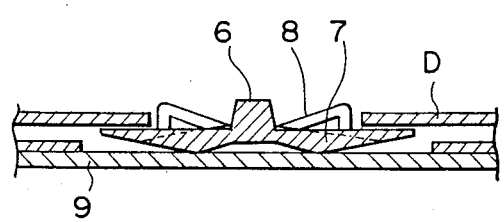

The disc tray of the invention is now illustrated with reference to FIGS. 3 and 4. The disc tray 1 of the invention is also made of a rigid plastic resin and shaped in a generally flat form with a circular center opening 5 and a circular recess 2 to mount a disc thereon in a similar manner to the prior art disc tray 11 described above. Several cavities 3,4 having a curved bottom surface are provided at appropriate circumferential positions of the tray 1 to facilitate putting of finger tips in mounting and demounting of a compact disc. Instead of collectively forming the central pushing part of a plural number of the upper flats 14a,14a of the cranked cantilevers 14,14 extending from the periphery of the circular center opening 15 in the prior art tray 11, the disc tray 1 of the invention has a center pushing part 6 shaped for its own purpose like a push button head, which is coaxial with the central circular opening 5 and raised above the upper surface level of the body of the tray 1 to form a space below for pressing down by a finger tip. The central pushing part 6 is connected to the periphery of the circular center opening 5 with a plurality of radially arranged connecting pieces 8,8. The number of the connecting pieces 8,8 is not particularly limitative but preferably at least three although FIGS. 3 and 4 show four connecting pieces 8,8. Each of the connecting pieces 8 is in a cranked form composed of an upper flat part 8a, riser part 8b and lower flat part 8c to be connected to the central pushing part 6 at the inward end of the upper flat part 8a and connected to the periphery of the circular center opening 5 at the outward end of the lower flat part 8c of each connecting piece 8. In this manner, the central pushing part 6 is elastically supported above the upper surface level of the tray body with a space below for pushing stroke. The riser parts 8b,8b of the connecting pieces 8,8 collectively form an approximately cylindrical surface at which a compact disc D mounted on the tray 1 is engaged with the center hole as is illustrated in FIGS. 5a and 6a. Optionally, a small swelling or protrusion 8d is formed on the shoulder portion of each connecting piece 8 so that the disc D can be secured at the correct position with increased reliableness to be prevented from inadvertent falling.

In addition to the above described radially arranged connecting pieces 8,8, a plurality of also radially arranged flap-like pieces 7,7 are connected to the central pushing part 6 in a cantilever manner extending horizontally or in an downwardly inclined direction from the lower surface of the central pushing part 6. The number of the flap pieces 8,8 is preferably the same as that of the connecting pieces 7,7 and each of the flap pieces 8,8 is positioned between two connecting pieces 8,8 each in a manner something like a spoke in a wheel around the center pushing part 6. The tray 1 is provided with a backing sheet member 9 on the lower surface to cover the circular center opening 5 from below. In the model illus-trated in FIGS. 6a and 6b, each of the flap pieces 7,7 has a thick-ness increasing from the center toward the outer free end but the thickness is largest at a distance from the axis smaller than the radius of the center hole of the disc D.

When a compact disc D is mounted on the above described disc tray 1, the disc D is put on the tray 1 at such a position that the center hole of the disc D is contacted and engaged with the riser parts 8b,8b of the connecting pieces 8,8 collectively forming a cylindrical surface and then pushed down so that the riser parts 8b, 8b are slightly tilted inwardly to permit downward movement of the disc D until the disc is settled on the upper surfaces of the flap pieces 7,7. When the pushing force on the central pushing part 6 is released, each of the connecting pieces 8,8 returns to the untilted position so that the riser parts 8b,8b are pressed against the inner periphery of the center hole of the disc D by the elastic resilience to hold the disc D with security (FIGS. 5a and 6a). When each of the connecting pieces 8,8 is provided with a shoulder protrusion 8d at about the upper end of the riser part 8b, the disc D mounted on the tray 1 in the above described manner is secured more reliably to be prevented from inadvertent falling.

Figure 5B:
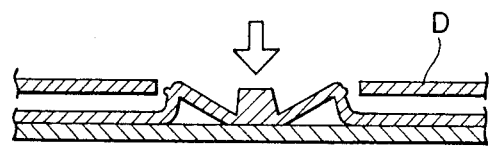
Figure 6B:
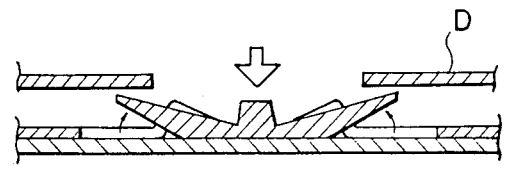

When the disc D on the disc tray 1 is to be demounted therefrom, the central pushing part 6 is pressed down by a finger tip until the lower surface of the pushing part 6 comes into contact with the backing sheet member 9 so that the upper flats 8a,8a of the connecting pieces 8,8 are pulled down at the inward ends and, as a consequence, the riser parts 8b,8b are tilted inwardly to facilitate the upward movement of the disc D (see FIG. 5b). When the central pushing part 6 has been fully pushed down to come into contact with the backing sheet member 9, the flap pieces 7,7 are raised up resiliently as is illustrated in FIG. 6b to lift the disc D mounted thereon. The shoulder protrusions 8d,8d on the connecting pieces 8,8 provide no resistance against lifting of the disc D since the riser parts 8b,8b of the connecting pieces 8,8 are tilted inwardly not to inhibit the upward movement of the disc D.

Figure 7:
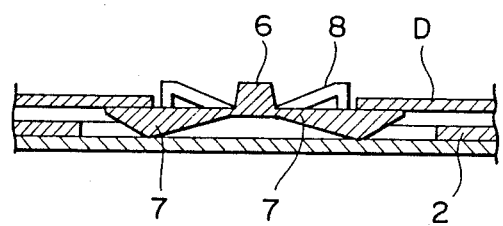
FIGS. 7 and 8 are each an axial cross sectional view of the center part of the inventive compact disc tray having flap pieces of a different cross section.
Figure 8:
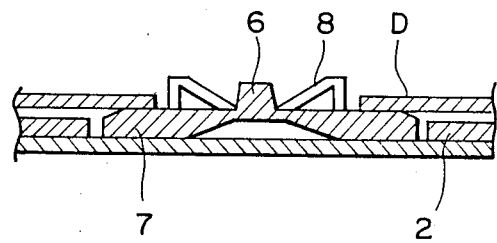

FIGS. 7 and 8 each illustrate a cross sectional view of the disc-engagement structure of the inventive compact disc tray having flap pieces of different forms. The difference in the model illustrated in FIG. 7 and the model described above is in the distance between the center axis and the point of each flap piece 7 having the largest thickness. In the model illustrated in FIGS. 6a and 6b, the flap piece 8 has the largest thickness within the center hole of the disc D while, in the model illustrated in FIG. 7, the flap piece 7 has the largest thickness at a distance from the center axis larger than the radius of the center hole of the disc D or, in other words, at a point which is contacted by the body of the disc D when the disc D is mounted thereon. This modification is advantageous to avoid some instability in mounting of a disc thereon caused by downward bending of the free end portion of the flap piece 7 when the disc D is pushed down with an excessively large force. The model illustrated in FIG. 8 has flap pieces 7,7 each having such a configuration that the free end portion thereof has a horizontally extending lower surface contacting with the backing sheet member 9. This model is also advantageous in respect of the stability of holding of a compact disc D thereon.

Figure 9A:
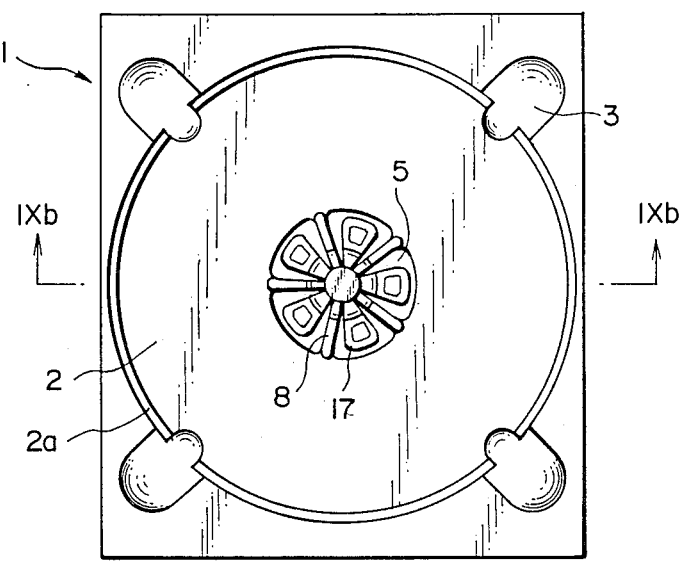
Figure 9B:
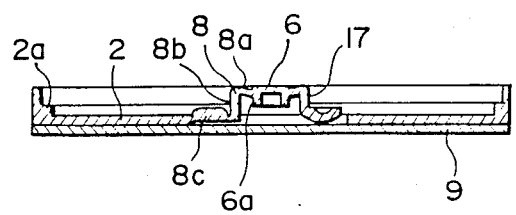

In a further alternative model of the inventive disc tray 1 illustrated in FIGS. 9a and 9b, each of the flap pieces 17,17 is shaped in a cranked configuration composed of the upper flat part extending horizontally from the central pushing part 6, a riser part downwardly extending from the outer end of the upper flat part and a lower flat part extending horizontally from the lower end of the riser part to form a free end within the center opening 5. Preferably, the upper flat parts of these flap pieces 17,17 are at the same height as the upper flat parts 8a,8a of the connecting pieces 8,8 and the riser parts of these flap pieces 17,17 collectively forms the same cylindrical surface as that formed collectively by the riser parts 8b,8b of the connecting pieces 8,8. Accordingly, the central pushing part 6, the horizontally extending upper flat parts of the connecting pieces 8,8 and the flap pieces 17,17 and the upright riser parts of the connecting pieces 8,8 and the flap pieces 17,17 collectively form a cylindrical push-button like configuration something like a birdcage. The lower free end of each of the flap pieces 17,17 has a round bottom surface contacting the backing sheet member 9. In this model also, pushing down of the center pushing part 6 causes inward tilting of the riser parts and hence the lower free ends of the flap pieces 17,17 are upwardly inclined with the contacting point to the backing sheet member 9 as the fulcrum to lift the compact disc mounted on the tray 1. As is seen in FIG. 9b, the central pushing part 6 is provided with an annular rib-like protrusion 6a on the lower surface to serve as a stroke limiter to prevent excessive downward pushing at the pushing part 6 which otherwise may cause breaking of the connecting pieces 8,8. It is of course optional that, instead of forming a stroke limiter 6a on the lower surface of the central pushing part 6, a stud-like protrusion is formed on the upper surface of the backing sheet member 9 at a position just below the central pushing part 6 so as to prevent excessive downward pushing of the central pushing part 6. Incidentally, it is desirable that the material and the surface fin-ishing of the disc tray 1 and/or the backing sheet member 9 are so pliable and smooth that friction and dust formation between the flap pieces 17,17 and the backing sheet member 9 are minimized to avoid possible troubles thereby. Further, the model illustrated in FIGS. 9a and 9b has a disc-mounting stage 2a along the circumference of the circular recess 2 and a compact disc mounted on the tray 1 rests on this disc-mounting stage 2a. By this means, the signal-bearing area of a compact disc mounted on the disc tray 1 is never contacted with the surface of the tray 1 so that any possible damage caused in the signal-bearing area of the disc by contacting with the tray surface can be completely avoided. It is optional that such a contacting-preventing means can also be provided when the circumference of the circular recess 2 is formed in the form of a downwardly narrowing conical surface in place of the disc-mount-ing stage 2a illustrated in FIGS. 9a and 9b.

As is described above in detail, the compact disc mounted on the inventive disc tray is held and secured reliably by the elastic resilience of the riser parts of the connecting pieces and, though optional, the flap pieces at the inner periphery of the center hole of the disc. Therefore, the disc jacket with the inventive disc tray is very safe from the influence of vibration or shock and suitable for use under adverse conditions on automobiles and the like. When the disc is to be demounted from the tray, on the other hand, the disc can be demounted without any resistance from the disc-engagement structure by the tilting movement of the riser parts with the aid of the lifting movement of the free ends of the flap pieces so that demounting of the disc can be performed by a single hand without causing damages in the disc. Furthermore, the connecting pieces are integrated with the central pushing part and the body of the tray so that they are free from deformation by the influences of temperature changes or repeated mounting and demounting of discs.

What is claimed is:

1. A holder tray of a compact disc which is a generally flat, integrally shaped body made of a rigid plastic resin provided with (a) a circular center opening, (b) a pushing part raised above the surface of the body of the tray to form a space for pushing stroke below the lower surface thereof and coaxially positioned with the circular center opening, (c) a plurality of radially arranged connecting pieces each in a cranked form composed of a lower flat part connected to the periphery of the center opening, upper flat part connected to the peripehry of the pushing part and a riser part connecting the lower and upper flat parts, the riser parts of the plurality of the radially arranged connecting pieces collectively forming an approximately cylindrical surface, and (d) a plurality of radially arranged flap pieces each cantilevered at the periphery of the pushing part and positioned between two connecting pieces.

2. The holder tray of a compact disc as claimed in claim 1 wherein each of the flap pieces is in a cranked form composed of a lower flat part forming a free end, upper flat part connected to the periphery of the pushing part and a riser part connecting the lower and upper flat parts, the riser parts of the plurality of the flap pieces collectively form-ing substantially the same cyclindrical surface as the cylindrical surface formed collectively by the riser parts of the connecting pieces.

* * * * *